United States Patent [19]
Hodsden et al.

[11] Patent Number: 6,065,462
[45] Date of Patent: May 23, 2000

[54] CONTINUOUS WIRE SAW LOOP AND METHOD OF MANUFACTURE THEREOF

[75] Inventors: John B. Hodsden; Jeffrey Burgess Hodsden, both of Colorado Springs, Colo.

[73] Assignee: Laser Technology West Limited, Colorado Springs, Colo.

[21] Appl. No.: 08/980,386

[22] Filed: Nov. 28, 1997

[51] Int. Cl.[7] .................................................. F41B 7/00
[52] U.S. Cl. ............................................. 125/21; 140/112
[58] Field of Search .................................. 125/21, 16.01, 125/16.02; 83/651.1; 451/541; 228/171, 136; 140/112

[56] References Cited

U.S. PATENT DOCUMENTS

| | | | |
|---|---|---|---|
| 3,707,865 | 1/1973 | Oriani | 140/112 |
| 4,911,209 | 3/1990 | Smith et al. | 140/112 |
| 5,316,052 | 5/1994 | Ritter et al. | 140/112 |

OTHER PUBLICATIONS

Welding Metallurgy, iron–iron carbide phase diagram, Fig 4.12, p. 330, 1952.
Metals Handbook, vol. 6, "Welding, Brazing, and Soldering",Ernest Nippes, 320–321, 1983.
Laser Technology West Limited Brochure, "Diamond Wire Selection".
Laser Technology West Limited Brochure, "Solid State Controller/Capstan/Accessories".
Laser Technology West Limited Brochure, "Cutting with Diamond Wire".
Laser Technology West Limited Brochure, "Model 203000/ Vertical Wire Saw".
Laser Technology West Limited Brochure, "Model 214000/ Crystal Wire Saw".
Laser Technology West Limited Brochure, "Model 206000/ Laboratory Wire Saw".
Laser Technology West Limited Brochure, "Model 208000/ Guillotine Series Saws".
Laser Technology West Limited Brochure, "Automatic Guillotine Series Saws".
Laser Technology West Limited Brochure, "Model 228120/ Profile Wire Saw".

*Primary Examiner*—David A. Scherbel
*Assistant Examiner*—Daniel G. Shanley
*Attorney, Agent, or Firm*—John R. Wahl; William J. Kubida; Hogan & Hartson LLP

[57] ABSTRACT

A closed loop wire saw loop, a method for making the closed wire saw loop, and an apparatus and method for slicing a work piece, in particular, a polysilicon or single crystal silicon ingot, utilizing a closed loop of diamond impregnated wire in which the work piece (or ingot) is rotated about its longitudinal axis as the diamond wire is driven orthogonally to it and advanced from a position adjoining the outer diameter ("OD") of the ingot towards its inner diameter ("ID"). In this manner, the diamond wire cuts through the work piece at a substantially tangential point to the circumference of the cut instead of through up to the entire diameter of the piece and single crystal silicon ingots of 300 mm to 400 mm or more may be sliced into wafers relatively quickly, with minimal 'kerf' loss and less extensive follow-on lapping operations. The closed wire saw loop is made by squaring and welding the wire ends together and then twice heat treating the weld at about 1500 F.

11 Claims, 3 Drawing Sheets

Fig. 4b  Fig. 4c

CONTINUOUS WIRE SAW LOOP AND METHOD OF MANUFACTURE THEREOF

BACKGROUND OF THE INVENTION

1. Field of the Invention

The present invention relates, in general, to the field of an apparatus and method for accurately sawing a work piece into two or more sections. More particularly, the present invention relates to an endless wire saw and a method for making an endless wire saw for cropping and/or slicing crystalline ingots, such as relatively large diameter polysilicon and single crystal silicon ingots.

2. Description of the Related Art

The vast majority of current semiconductor and integrated circuit devices are fabricated on a silicon substrate. The substrate itself is initially created utilizing raw polycrystalline silicon having randomly oriented crystallites. However, in this state, the silicon does not exhibit the requisite electrical characteristics necessary for semiconductor device fabrication. By heating high purity polycrystalline silicon at temperatures of about 1400 degrees, a single crystal silicon seed may then be added to the melt and a single crystalline ingot pulled having the same orientation of the seed. Initially, such silicon ingots had relatively small diameters of on the order of from one to four inches, although current technology can produce ingots of 150 mm (six inches) or 200 mm (eight inches) in diameter. Recent improvements to crystal growing technology now allow ingots of 300 mm (twelve inches) or 400 mm (sixteen inches) in diameter to be produced.

Once the ingot has been produced, it must be cropped (i.e. the "head" and "tail" portions of the ingot must be removed) and then sliced into individual wafers for subsequent processing into a number of die for discrete or integrated circuit semiconductor devices. One method for cropping the ingot is through the use of a band saw having a relatively thin flexible blade. However, the large amount of flutter inherent in the band saw blade results in a very large "kerf" loss and cutting blade serration marks which must then be lapped off.

One technique of slicing a semiconductor ingot into wafers is the slurry saw. The slurry saw comprises a series of mandrels about which a very long wire is looped and then driven through the ingot as a silicon carbide or boron carbide slurry is dripped onto the wire. Wire breakage is a significant problem and the saw down time can be significant when the wire must be replaced. Further, as ingot diameters increase to 300 mm to 400 mm the drag of the wire through the ingot reaches the point where breakage is increasingly more likely unless the wire gauge is increased resulting in greater "kerf" loss. Importantly, a slurry saw can take many hours to cut through a large diameter ingot.

A much preferred technique for slicing an ingot into wafers is disclosed in copending patent application Ser. No. 08/888,952, filed Jul. 7, 1997, now U.S. Pat. No. 5,878,737, and entitled Apparatus and Method For Slicing A Workpiece Utilizing A Diamond Impregnated Wire, the disclosure of which is hereby incorporated by reference in its entirety. This technique is a method for slicing a work piece, in particular, a polysilicon or single crystal silicon ingot utilizing a length of diamond impregnated wire in which the work piece (or ingot) is rotated about its longitudinal axis as the diamond wire is driven back and forth orthogonally to the longitudinal axis of the work piece and advanced from a position adjoining the outer diameter ("OD") of the ingot towards its inner diameter ("ID"). In this manner, the diamond wire cuts through the work piece at a point substantially tangential to the circumference of the cut instead of through up to the entire diameter of the piece. Through use of this technique, polysilicon or single crystal silicon ingots of 300 mm to 400 mm or more may be sliced into wafers relatively quickly, with minimal 'kerf' loss and less extensive follow-on lapping operations.

There is no known continuous wire saw loop that can be used to make these extremely fine cuts. Consequently, the apparatus for sectioning a substantially cylindrical crystalline work piece with this technique uses a relatively long length of wire having a plurality of cutting elements affixed thereto which has both ends wrapped around a capstan which alternatingly rotates first in one direction and then an opposite direction, while the work piece rotates continuously in one direction or alternately in opposite directions to the movement of the wire. This technique and apparatus results in faster, finer cuts than the slurry saw can produce.

Laser Technology West, Limited, Colorado Springs, Colo., a manufacturer and distributor of diamond impregnated cutting wires and wire saws, has previously developed and manufactured a proprietary diamond impregnated wire marketed under the trademarks Superwire™ and Superlok™. These wires comprise a very high tensile strength steel core with an electrolytically deposited surrounding copper sheath into which very small diamonds (on the order of between 20 to 120 microns) are uniformly embedded. A nickel overstrike in the Superlok wire serves to further retain the cutting diamonds in the copper sheath.

The band saw technique discussed first above requires an endless loop saw blade band. Such an endless loop would be extremely efficient at cutting ingots. In addition, multi-loop band saws machines could be constructed to make simultaneous cuts and thus greatly shorten the processing time for these ingots. However, in order to accurately cut without significant kerf losses and scoring of the cut surfaces, an extremely fine wire saw loop would be required instead of a band, using a wire such as the diamond impregnated wire described in the previous paragraph.

Unfortunately, known attempts to make a suitable wire saw loop that can withstand the stresses of operation have all failed. These wire saw wires are extremely small diameter wires, on the order of 0.005–0.015 inch diameter wire. The formation of a wire loop requires welding the ends of the wire together. The welding of such wire materials together forms a brittle region at the weld, thus predisposing the wire loop to failure at the weld location. Conventional teachings require that the ends of the wire must be either shaped to have a slanted end surface so that the ends overlap in order to have a sufficient surface area at the weld location or shaped to provide blunted and rounded tips that are abutted and then melted together during the weld process. The overlapping and blunting results in a thickened, embrittled region at the weld which can bind in the saw kerf, leading to immediate wire breakage. Conventional annealing and heat treating of the weld leads to weakened wire strengths at the weld, again leading to premature failures. Thus an appropriate closed wire saw loop that can be used is lacking in the prior art. Attempts to fabricate a suitable wire loop in the past have all resulted in unacceptable breakage at the weld location. Consequently, closed wire saw loops are simply unknown in the semiconductor wafer manufacturing industry.

Therefore there is a need for diamond impregnated closed wire saw loop for use in cutting a work piece such as a semiconductor crystal ingot into thin, accurately cut wafers, an apparatus for such a saw loop, and a method of making such a wire saw loop that overcomes the above problems.

SUMMARY OF THE INVENTION

A method of forming a continuous or closed loop of wire having a plurality of cutting elements affixed thereto in accordance with the present invention comprises the steps of:

1) providing a steel wire having a tensile strength of at least 300,000 psi and having opposite ends;
2) butting the wire ends together;
3) welding the wire ends together creating a weld;
4) heating the welded wire ends and the weld to a temperature between 1450 F. and 1550 F. and allowing the welded ends and the weld to air cool;
5) removing excess weld material from the weld and the welded ends;
6) again heating the welded wire ends and the weld to a temperature between 1450 F. and 1550 F. and allowing the welded ends and the weld to air cool.

More preferably, the method according to the invention comprises the steps of 1) providing a steel wire having a central wire axis and a tensile strength of at least 300,000 psi;
2) squaring each of the ends of the wire to form surfaces at right angles to the axis of the wire;
3) butting the end surfaces of the wire ends coaxially together;
4) applying an electrical current through the ends to electrically weld the ends of the wire together;
5) heating the welded together ends to about 1500 degrees Fahrenheit;
6) allowing the welded ends to air cool to less than about 500 degrees Fahrenheit;
7) removing excess weld material from the welded ends until the weld diameter substantially equals the wire diameter;
8) again heating the welded together ends to about 1500 degrees Fahrenheit followed by air cooling; and
9) affixing an abrasive material to the surface of the wire loop.

A wire endless loop in accordance with the present invention has a wire diameter of less than 0.020 inch and preferably between about 0.008 inch and 0.012 inch and is formed of a steel wire having a high tensile strength of at least 300,000 psi and a highly stable carbon matrix. One such steel is commonly known as "Carpenters Stainless Steel Type 321". The wire loop abrasives are preferably fastened and distributed uniformly over the outer surface of the wire loop.

An apparatus for sectioning a semiconductor work piece in accordance with the invention preferably includes at least one continuous closed wire saw loop, a wire drive mechanism for moving the wire orthogonally with respect to the work piece longitudinal axis, a work piece rotation mechanism for rotating the workpiece about its axis, a wire advancing mechanism for positioning the wire from a first position proximate an outer diameter of the work piece to a second position proximate the axis of the work piece or inner diameter thereof. The wire saw loop continuously moves tangentially to the cut as the saw wire loop simultaneously advances through the work piece to its center or inner diameter, at which point the cut is complete. The apparatus may include a number of wire saw loops on the drive mechanism for making a like number of cuts simultaneously. The apparatus may also be configured as above but without a work piece rotation mechanism for those applications where tangential cutting of a work piece is not required.

Still further disclosed herein is a semiconductor wafer made by a process which comprises the steps of providing a continuous loop of wire having a plurality of cutting elements affixed thereto, continuously moving the wire loop orthogonally to a longitudinal axis of a crystalline semiconductor material ingot, rotating the ingot about its longitudinal axis and advancing the wire loop from a first position proximate an outer diameter of the ingot to a second position proximate an inner diameter thereof.

Other objects, features and advantages of the present invention will become apparent from a reading of the following detailed description when taken in conjunction with the accompanying drawing wherein a particular embodiment of the invention is disclosed as an illustrative example.

BRIEF DESCRIPTION OF THE DRAWINGS

FIGS. 4a through 4e are sequential views of the weld formation method for the wire loop shown in FIGS. 2 and 3. Specifically, FIG. 4a is a schematic side view of a pair of loop ends prior to squaring the ends.

FIG. 4b is a side view of the pair of loop ends of wire abutted together and placed in resistance welder clamps.

FIG. 4c is a side view as in 4b after the ends are welded together.

FIG. 4d is a side view of the weld region after heat treatment in an annealing chamber.

FIG. 4e is a side view of the weld region after removal of excess weld material and following a second heat treatment in an annealing chamber.

DETAILED DESCRIPTION OF THE INVENTION

Figure 1:
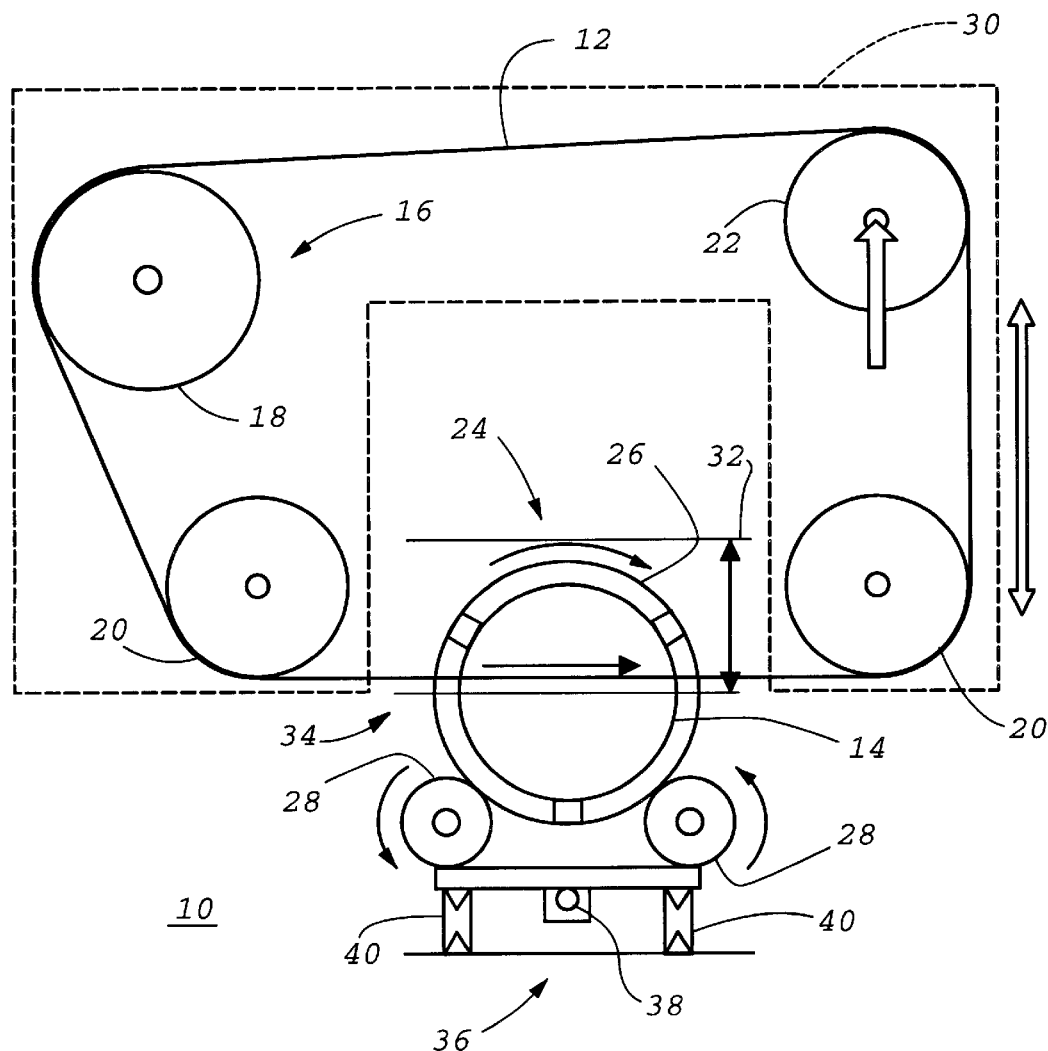
FIG. 1 is a simplified representational view of an apparatus for slicing a work piece, in particular a single crystal silicon ingot, in accordance with an exemplary implementation of the present invention.

With reference now to FIG. 1, a simplified representational view of an apparatus 10 for slicing a generally cylindrical work piece, for example, a polysilicon or single crystal silicon, gallium arsenide (GaAs) or other crystalline ingot 14, is shown. The apparatus 10 comprises, in pertinent part, one or more cutting wire loops 12 made in accordance with the invention. Each of the wire saw loops 12 is utilized to accurately and rapidly crop and saw a generally cylindrical silicon ingot 14 into multiple silicon wafers for subsequent processing into discrete or integrated circuit devices.

The apparatus 10 includes a wire drive mechanism 16 for moving one or a plurality of wire saw loops 12 in a single direction as indicated by the arrow with respect to the longitudinal axis of the ingot 14. The wire drive mechanism 16, in the embodiment shown, drives a driven friction wheel 18 to move the wire around two guide pulleys 20 while tension is maintained by a tension pulley 22.

The apparatus 10 optionally further includes a work piece rotation mechanism 24, as shown, for rotating the ingot 14 about its longitudinal axis as the wire loop 12 is moved orthogonally with respect to the ingot 14. The work piece rotation mechanism 24, in the embodiment shown, may comprise one or more rotating collet fixtures 26 circumferentially surrounding the ingot 14 at positions along its length thereof. The collet fixtures 26, and hence the ingot 14, may be rotated by means of a number of drive rollers 28 or functionally equivalent elements. In an alternative embodiment, the ingot 14 may be secured to an end mounted work piece rotation mechanism 24 in lieu of the embodiment illustrated in this figure.

The apparatus 10 also includes a wire advancing mechanism 30 to which, in the embodiment illustrated, the wire drive mechanism 16 is mounted. The wire advancing mechanism 30 functions to advance the moving wire loop 12 from an initial position 32 displaced outwardly from, and proximate to, the outer diameter ("OD") of the ingot 14 towards a final position 34 proximate the inner diameter ("ID") of the ingot 14 to effectuate completion of a single cut. At this point, the motion of the wire advancing mechanism 30 may be reversed to withdraw the wire 12 back towards the initial position 32.

Alternatively, the wire advancing mechanism 30 may be configured to advance the moving wire loop 12 completely through the ingot 14 if the ingot rotating mechanism is not used. Also, in applications wherein repeated cuts or slices through the ingot 14 are desired, the apparatus 10 may further incorporate a work piece repositioning mechanism 36 to enable an indexed, translational repositioning of the ingot 14 to enable the wire 12 to make repeated cuts along its length, for example, to slice a number of wafers therefrom. In the embodiment of the apparatus shown in FIG. 1, the work piece repositioning mechanism 36 may include a programmably index driven lead screw 38 which reposition the work piece rotation mechanism 24 and ingot 14 as supported by a number of rollers 40 with respect to the wire saw 12. In alternative embodiments, the wire drive mechanism 16 and wire advancing mechanism 30 may be repositionable with respect to a generally fixed position work piece rotation mechanism 24.

Figure 2:
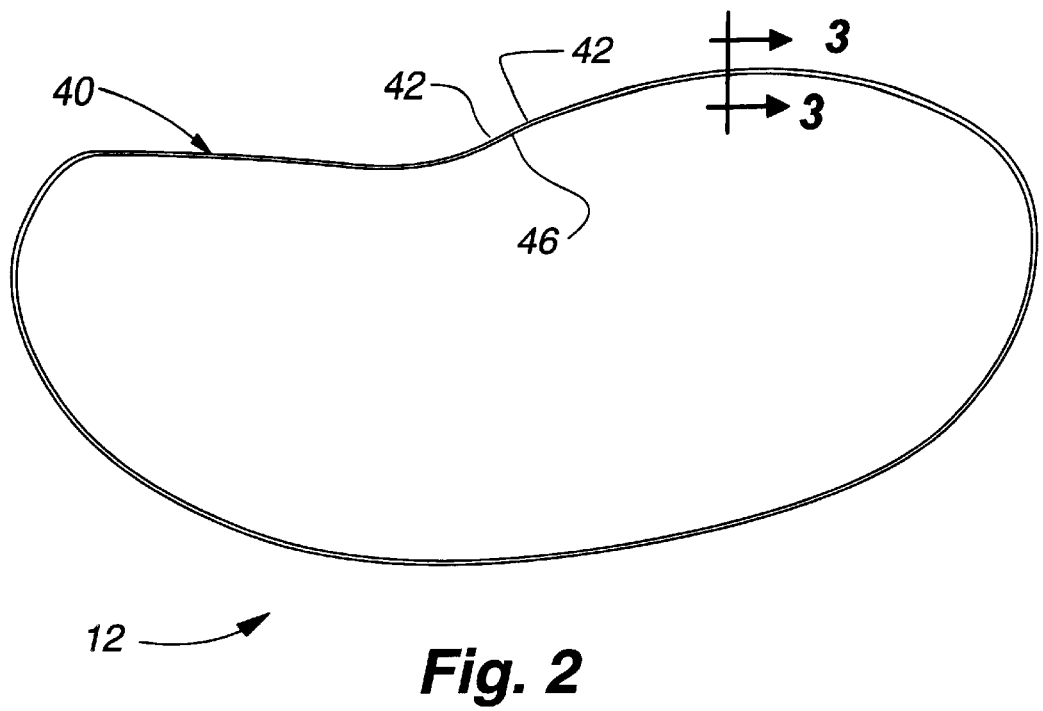
FIG. 2 is a perspective view of a complete wire saw loop in accordance with the present invention.
Figure 3:
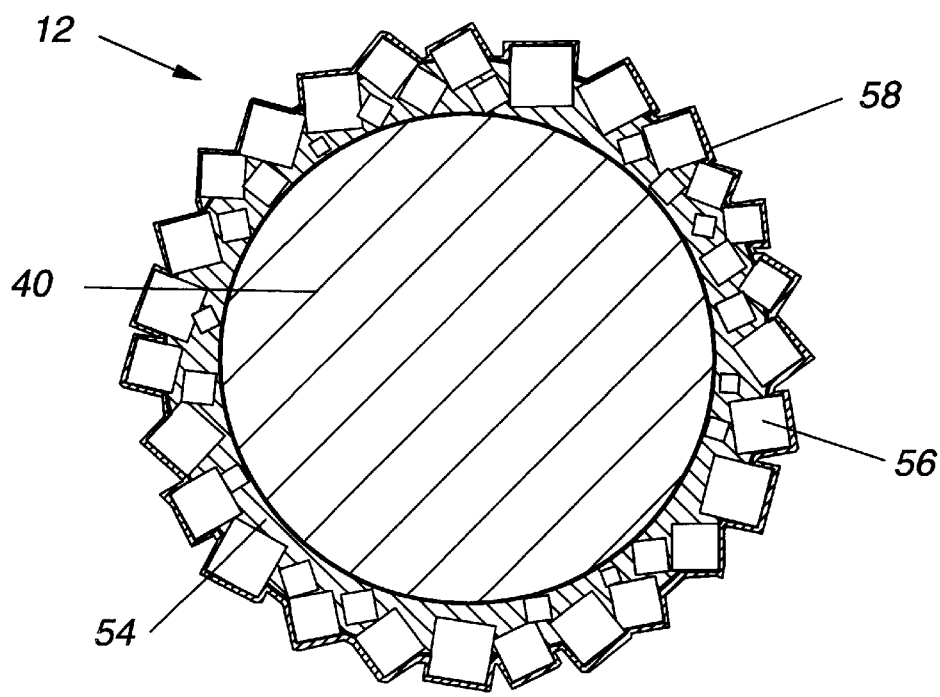
FIG. 3 is an enlarged cross sectional view of the wire loop taken along the line 3—3 in FIG. 2.

The wire saw loop 12 is shown separately in FIG. 2 and in a sectional view in FIG. 3. With particular reference to FIG. 2, the wire saw loop 12 is made of a wire core 40 which has two ends 42 and 44 joined together by a weld 46. The wire core 40 of the loop 12 is made from carpenter stainless steel type 321. Carpenter Stainless Steel Type 321 is an austenitic chrome nickel steel. Metallurgical literature states that this steel should be annealed at 1750–1950 F. followed by water quench. According to the literature, stabilizing should be done at 1550 to 1650 F. Surprisingly, it has been found that this particular type of stainless steel, when fabricated into wire core 40 having a diameter of less than about 0.016 inches and a tensile strength of between 300,000 to 400,000 psi, and more preferably between 350,000 and 400,000 psi can be resistively welded together and conditioned at a temperature in a range between about 1450 F. to about 1550 F. and preferably at about 1500 F. to substantially return its characteristic properties at the weld location to a before weld condition. Thus the wire 40 at the weld 46 becomes as flexible and as strong as the remainder of the wire loop 12 when conditioned in accordance with the present invention.

It has also been experimentally determined that the wire end surfaces should be squared rather than slanted and abutted together at about right angles to the axis of the wire during the welding operation. Also, the heat treatment at elevated temperature must be performed twice, once before weld material removal and once after weld material removal.

Figure 4A:
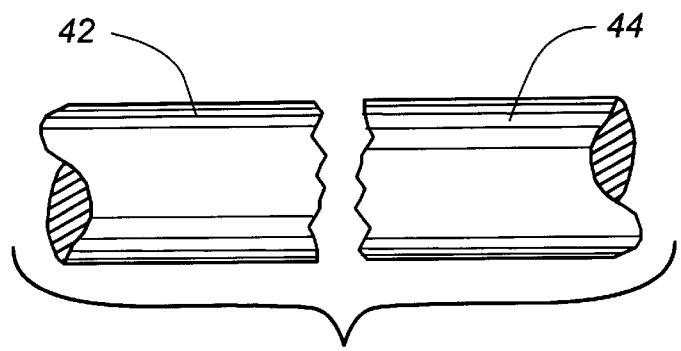
Figure 4D:
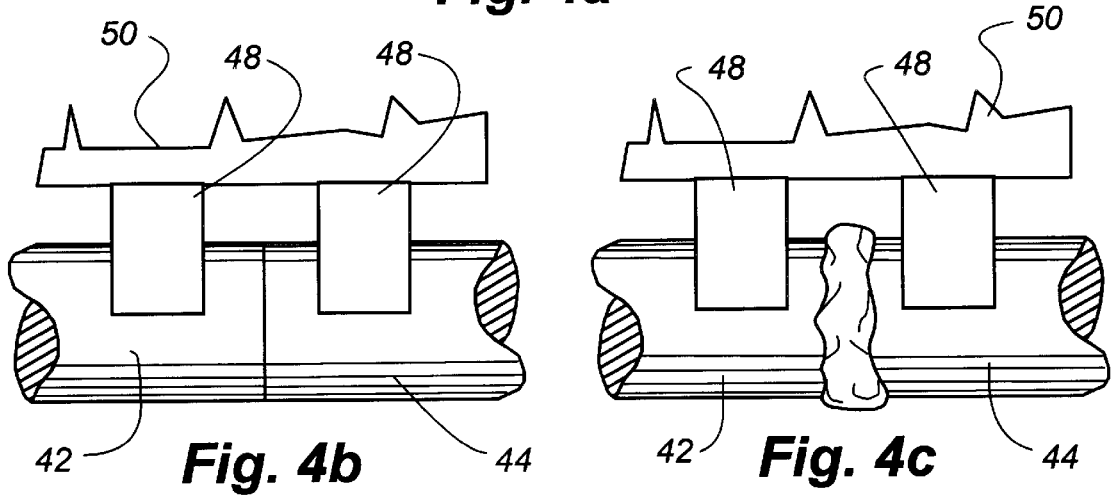
Figure 4D:
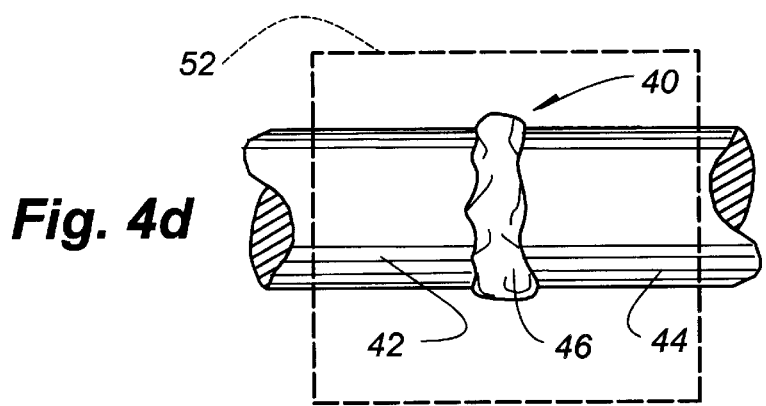
Figure 4E:
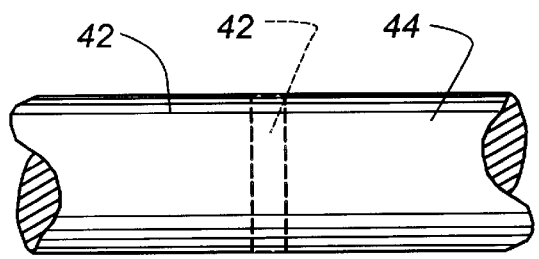

The method of forming the wire loop 12 in accordance with the present invention basically comprises the following steps;

1) providing a steel wire having a tensile strength of at least 300,000 psi and having opposite ends 42 and 44 as shown in FIG. 4a;
2) butting the wire ends together as is shown in FIG. 4b;
3) welding the wire ends together creating a weld as shown in FIG. 4c;
4) heating the welded wire ends and the weld as shown in FIG. 4d to a temperature between 1450 F. and 1550 F. and allowing the welded ends and the weld to air cool;
5) removing excess weld material from the weld and the welded ends as shown in FIG. 4e;
6) again heating the welded wire ends and the weld to a temperature between 1450 F. and 1550 F. and allowing the welded ends and the weld to air cool.

More preferably, the method of forming the closed wire loop 12 comprises the steps of:

1) providing a piece of high strength stainless steel wire 40 having opposite ends 42 and 44 as shown in FIG. 4a;
2) squaring off each of the ends 42, 44 to form an end surface orthogonal to the axis through the wire 40;
3) placing the ends 42 and 44 of the wire 40 together abutting each other coaxially in a resistance welder 50;
4) applying an electrical current through the welder 50 effective to weld the abutting wire ends 42 and 44 together at temperatures in a range of 2100–3000 F. forming a weld 46;
5) placing the weld 46 and the welded ends 42 and 46 in a commercially available annealing chamber 52 such as a Microweld annealing chamber;
6) raising temperature in the annealing chamber and said welded ends to a temperature below the annealing temperature for Type 321 steel, between 1475 F. and 1525 F., and preferably about 1500 F. to heat treat the weld;
7) turn off the annealing chamber temperature control and allowing the chamber 52 and the weld 46 to cool to at least less than 500 F. and preferably to ambient temperature;
8) removing the welded ends 42 and 44 from the chamber 52 and removing excess weld material until the weld is substantially flush with, i.e. has the same diameter as the wire 40;
9) placing the welded ends 42 and 44 back in the annealing chamber 52;
10) raising temperature in the annealing chamber a second time to bring said welded ends 42, 44 and said weld 46 to a temperature below the annealing temperature for Type 321 steel, between 1475 F. and 1525 F., and preferably about 1500 F. to heat treat the weld a second time; and
11) allowing the chamber 52 and the weld 46 to cool naturally to at least 500 F. and preferably to ambient; and
12) removing the welded ends 42, 44 from the chamber 52.

A closed loop of wire 40 formed by the above method is essentially as strong as the unwelded length of wire 40. The tensile strength of the unwelded wire 40 is between 300000 to 400000 psi and preferably around 375,000 to 400,000 psi. It has been experimentally found that for Carpenters' Steel Type 321, the optimum heat treatment temperature in the method of the present invention is about 1500 F. Temperatures substantially above this temperature cause premature weakening of the weld as do temperatures substantially below this temperature. There appears to be a Gaussian distribution of weld strengths close about this temperature of 1500 F. with a peak strength at 1500 F.

Referring now to FIGS. 4a through 4e, the above sequence of steps is illustrated. In FIG. 4a, the raw ends 42 and 44 are shown prior to being squared and butted together in the welder clamps 48 as is shown in FIG. 4b. FIG. 4c shows the wire ends 42 and 44 welded together at weld 46, prior to the ends being removed from the welder 50. The welded ends 42 and 44 are next placed in an annealing oven 52 as shown in FIG. 4d. However, the weld 46 and the ends 42 and 44 are not annealed. The temperature of the oven 52 is simply raised to about 1500 F. and then turned off to allow the weld to cool to about 500 F. before the weld 46 is removed.

As shown in FIG. 4e, the excess weld material on weld 46 is ground away to leave the weld 46 flush with the surface of the wire 40. The weld 46 is then again placed in the oven 52 and temperature raised to about 1500 F. and then air cooled to below about 500 F. The closed loop of wire 40 is then removed and thoroughly allowed to cool to ambient temperature.

After formation of the wire loop as described above, the abrasive material is affixed to the wire loop. In the particular preferred embodiment shown in FIGS. 2 and 3, the wire saw loop 12 is formed with a coating of a metal 54 that is softer than the steel wire 40, such as copper or nickel. Preferably an electrolytic metal is such as copper or nickel is used. The layer of copper or nickel is electrolytically plated on the closed loop of wire 40 in an appropriate electrolytic bath and then industrial diamond particles 56 are mechanically impregnated into the layer or coating 54 to provide the abrasive substance on the wire saw loop 12. Finally, a thin layer 58 of nickel, of preferably about 0.0002 to 0.0005 inch thickness is electroplated over the entire structure to help seat the diamond abrasive particles 56.

For example, a wire diameter of about 0.012 inch, the copper or nickel coating 54 with diamonds 56 mechanically impregnated therein has a thickness of about 0.002 inch to yield an overall wire saw diameter of about 0.016 inch.

Other methods of adhering abrasives such as diamond particles 56 or other hard materials such as tungsten carbide to the wire 40 could also be utilized in the present invention. For example, an adhesive bonding agent may be applied to the wire and the abrasive materials bonded to the adhesive bonding agent. In this case, the glue or bonding agent would be applied to the wire surface and then the wire loop rolled through an abrasive powder.

While there have been described above the principles of the present invention in conjunction with specific apparatus and wire sawing techniques, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. A method of making a closed wire loop comprising the steps of:
   a) providing a single thread of steel wire having a diameter of less than 0.020 inches, a tensile strength of at least 300,000 psi and having opposite wire ends;
   b) butting the wire ends together;
   c) welding the butted wire ends together creating a closed wire loop including a weld;
   d) heating the welded wire ends and the weld to a temperature between 1450 F. and 1550 F. and allowing the welded ends and the weld to air cool;
   e) removing excess weld material from the weld and the welded ends; and
   f) repeating step d).

2. The method according to claim 1 wherein step b includes shaping said wire ends to have an end surface orthogonal to a longitudinal axis of said wire.

3. The method according to claim 1 wherein step d is performed in a temperature range between 1475 F. and 1525 F.

4. The method of claim 1 wherein the diameter of the steel wire is in the range of from about 0.008 inch to about 0.012 inch.

5. The method of claim 4 wherein the steel wire is a stainless steel wire.

6. A method of forming a closed wire saw loop comprising the steps of:
   a) providing a single thread of steel wire having a diameter of less than 0.020 inches, a central wire axis, a tensile strength of at least 300,000 psi, a first wire end, and a second wire end;
   b) squaring each of the wire ends to form end surfaces at right angles to the axis of the wire;
   c) butting the end surfaces of the wire ends coaxially together;
   d) applying an electrical current through the wire ends to electrically weld the butted wire ends together;
   e) heating the welded together wire ends to a range of about 1475 to about 1525 degrees Fahrenheit;
   f) allowing the welded together wire ends to air cool to a temperature less than about 500 degrees Fahrenheit;
   g) removing excess weld material from the welded together wire ends until a weld diameter substantially equals the wire diameter;
   h) again heating the welded together wire ends to a range of about 1475 to about 1525 degrees Fahrenheit; and
   i) again allowing the welded together wire ends to air cool to a temperature less than about 500 degrees Fahrenheit.

7. The method according to claim 6 further comprising the step of adhering an abrasive to an outside surface of said closed wire saw loop.

8. The method according to claim 6 wherein said temperatures in steps e and h is about 1500 F.

9. The method according to claim 6 wherein said tensile strength is between about 375,000 to about 400,000 psi.

10. The method of claim 6 wherein the diameter of the steel wire is in the range of from about 0.008 inch to about 0.012 inch.

11. The method of claim 10 wherein the steel wire is a stainless steel wire.

* * * * *